United States Patent [19]

Jacoby et al.

[11] Patent Number: 5,236,963
[45] Date of Patent: Aug. 17, 1993

[54] ORIENTED POLYMERIC MICROPOROUS FILMS

[75] Inventors: Philip Jacoby, Naperville, Ill.; William T. Tapp, Marietta, Ga.

[73] Assignee: Amoco Corporation, Chicago, Ill.

[21] Appl. No.: 998,450

[22] Filed: Dec. 30, 1992

Related U.S. Application Data

[63] Continuation-in-part of Ser. No. 749,213, Aug. 23, 1991, Pat. No. 5,176,953.

[51] Int. Cl.$^5$ ............................................. C08J 9/00
[52] U.S. Cl. ..................................... 521/92; 521/134; 524/427; 524/505; 524/515; 525/88; 525/240
[58] Field of Search .................. 525/88, 240; 524/427, 524/505, 515; 521/134, 92

[56] References Cited

U.S. PATENT DOCUMENTS

| | | | |
|---|---|---|---|
| 5,045,589 | 9/1991 | Ueno | 525/88 |
| 5,147,933 | 9/1992 | Koizumi | 525/88 |
| 5,176,953 | 1/1993 | Jacoby | 525/88 |
| 5,180,629 | 1/1993 | Terada et al. | 525/88 |

*Primary Examiner*—Morton Foelak
*Attorney, Agent, or Firm*—Matthew R. Hooper; Stephen L. Hansely; Frank J. Sroka

[57] ABSTRACT

This invention relates to polymeric compositions capable of being converted into oriented microporous films having microvoid cells, interconnecting pores between the cells, and improved elongation, softness and tear strength, comprising an ethylene-propylene block copolymer having an ethylene content of about 10 to about 50 wt %, a low flexural modulus propylene-based polymer, a propylene homopolymer or copolymer having up to about 10 wt % of a comonomer of ethylene or an α-olefin of 4 to 8 carbon atoms, an inorganic filler such as calcium carbonate, a beta-spherulite nucleating agent, and optionally, a low molecular weight polypropylene and to microporous films formed from such compositions.

4 Claims, No Drawings

ORIENTED POLYMERIC MICROPOROUS FILMS

CROSS-REFERENCE TO RELATED APPLICATION

This application is a continuation-in-part application of copending application U.S. Ser. No. 07/749,213, filed Aug. 23, 1991, now U.S. Pat. No. 5,176,953.

FIELD OF THE INVENTION

This invention relates to polymeric compositions capable of being converted into oriented microporous films having microvoid cells, interconnecting pores between the cells, improved elongation, softness and tear strength, comprising an ethylene-propylene block copolymer having an ethylene content of about 10 to about 50 wt %, a low flexural modulus propylene-based polymer, a propylene homopolymer or copolymer having up to about 10 wt % of a comonomer of ethylene or an α-olefin of 4 to 8 carbon atoms, an inorganic filler such as calcium carbonate, a beta-spherulite nucleating agent, and optionally, a low molecular weight polypropylene and to microporous films formed from such compositions.

BACKGROUND OF THE INVENTION

Microporous polymeric films having structures that enable vapors to flow through them such that they are breathable or have breathability while at the same time inhibiting or stopping the flow of liquids through them have been known for some time. These types of films have been utilized in a wide variety of applications, such as in the preparation of synthetic leather, in the preparation of cloth laminates for use as synthetic shoes, raincoats, outer wear, camping equipment such as tents, and the like, and in combination with fabrics and other materials for preparation of medical applications such as surgical gowns, bandages, and the like, and applications such as house wrap, covers for automobiles and other motorized vehicles, and the like.

A variety of porous stretched polymeric films are known in the art. In general, three types of processes are typically used to manufacture porous, melt-processed polymeric films that include an orientation step. These three types are processes for stretching films of neat, unblended polymers containing no fillers other than typical stabilizing additives; processes for making films from blends of two or more polymers, or from blends of polymer with mineral oil or an organic salt dispersed in the blends in which the dispersed phase is extracted with the film stretched before or after extraction; and processes for casting films from blends of polymer with a filler such as calcium carbonate or barium sulfate with no extraction and the film oriented after casting.

Patents disclosing porous polymeric films known in the art are described in commonly assigned U.S. Pat. No. 4,975,469 which discloses oriented porous polymeric films formed from a polypropylene-based resin and having a moisture vapor transmission rate (MVTR) determined according to ASTM E-96, procedure E, in the range of about 2,500 to about 7,500 g/m²/24 hr, and a process for forming such films. The aesthetic characteristics of these polypropylene porous films show a somewhat stiffer nature or harsher hand relative to porous film made from synthetic materials other than polypropylene and that they have a tendency to produce a "rustling" noise when flexed.

Commonly assigned U.S. Pat. No. 4,386,129 discloses a porous polymeric film having pores with polygonal cross sections and average pore diameters of about 3 to about 100 microns formed from a resinous polymer of propylene and a process for forming such film comprising the steps of forming film containing beta-spherulites and subsequently selectively extracting the beta-spherulites. Such films have utility as filtration devices, raincoats and tents.

U.S. Pat. No. 5,008,296 discloses microporous films prepared by casting film from compositions of a polyolefin and high levels of $CaCO_3$ or glass beads and calcium stearate and biaxially stretching the film from 1.5 to 7 times in each direction with the resulting film having Gurley porosities of from 0.1 to 85 seconds.

Despite the various porous films and methods of preparing same disclosed in the patents discussed above, there remains a need for polymeric compositions capable of being formed into microporous films having increased elongation, improved breathability and for a facile process for forming such microporous films.

It is an object of this invention to provide improved polymeric compositions capable of being converted into oriented microporous polymeric films. Another object of this invention is to provide oriented microporous polymeric film having improved elongation, tear strength, softness and lower "noise level" upon handling or flexing. Other objects of this invention will be apparent to persons skilled in the art from the following description and claims.

Advantageously, we have found that the polymeric compositions of this invention provide oriented microporous films that exhibit improved extensibility and that are useful for apparel applications such as sportswear, ski clothing, lining material for such apparel, medical apparel such as surgical drapes, protective gowns and garments, equipment covers, filters, housewrap, pressure sensitive labels and the like.

SUMMARY OF THE INVENTION

The objects of the invention are provided by a polymeric composition capable of being converted into an oriented polymeric microporous film and to such microporous film wherein the film comprises, based on 100 parts by weight, about 30 to about 65 parts by weight of a component A comprising an ethylene-propylene block copolymer having an ethylene content of about 10 to about 50 wt %, about 55 to about 5 parts by weight of a component B comprising a low flexural modulus propylene-based polymer having a flexural modulus of 20,000 psi or less as measured according to ASTM D-790, about 15 to about 30 parts by weight of a component C comprising a propylene homopolymer or random copolymer having up to about 10 wt % of a comonomer of ethylene or an α-olefin of 4 to 8 carbon atoms, and 0 to about 5 parts by weight, per 100 parts by weight of components A, B and C, of a component D comprising a low molecular weight polypropylene having a melt viscosity of about 50 to about 1,000 poise measured at a shear rate of 136 sec$^{-1}$ and 190° C., 10 to about 30 parts by weight, per 100 parts by weight of components A, B and C, of a component E comprising calcium carbonate, and 0.1 to about 10 ppm, per 100 parts by weight of components A, B and C, of a component F comprising a beta-spherulite nucleating agent.

DESCRIPTION OF THE INVENTION

In greater detail, the polymeric compositions of this invention are capable of being converted into oriented polymeric microporous films which have improved elongation, tear strength and softness. In general, the compositions comprise an ethylene-propylene block copolymer, a polypropylene homopolymer or random copolymer, a low flexural modulus propylene-based polymer, a beta-spherulite nucleating agent, an inorganic filler such as calcium carbonate, and optionally, a low molecular weight polypropylene having a specific range of melt viscosity.

Component A comprising an ethylene-propylene block copolymer is a block copolymer containing crystalline polypropylene and polyethylene segments and has an ethylene content of about 10 to about 50 wt %. The crystalline polypropylene segment has a melting point between 150° to 165° C. as measured by Differential Scanning Calorimetry (DSC), and preferably, for optimum porous film properties such as a MVTR greater than 2,500 g/m$^2$/24 hr, the polypropylene segment has a melting point between 157° to 163° C. The heat of fusion, also measured by DSC, is in the range of about 2 to 15 cal/g, preferably in the range of 5 to 10 cal/g. The crystalline polyethylene segment has a DSC melting point of 100° to 135° C., preferably 115° to 125° C., and a DSC heat of fusion of about 0.2 to 10 cal/g, preferably 0.5 to 3 cal/g. The melt flow rate (MFR) according to ASTM D-1238 of the ethylene-propylene block copolymer is typically about 0.5 to about 5.0 dg/min. Such block copolymers and methods for production thereof are known, as for example, a process for polymerizing propylene and ethylene in a multiplicity of steps in a polymerization system in the presence of a Ziegler-type stereospecific catalyst or a Ziegler-type stereospecific catalyst component of a carrier-supported transition metal compound and an organoaluminum compound. Such block copolymers are also commercially available, for example, Hifax TM RA-061, a thermoplastic olefin of Himont Inc., which has a nominal MFR according to ASTM D-1238 of 0.8 to 1.0 dg/min, a density of 0.88 g/cm$^3$ and a typical melt processing temperature range of 193° to 227° C. Particularly preferred for producing highly breathable oriented microporous film as measured by the MVTR, determined according to ASTM E-96, procedure E, is an ethylene-propylene block copolymer having an ethylene content of about 30 to about 45 wt %.

Component B comprises a propylene-based polymer having a flexural modulus of 20,000 psi or less as measured by ASTM D-790. Propylene-based polymers which have such a low flexural modulus and which are compatible with the other components of the polymeric compositions of this invention are suitable polymers and can be polymers such as ethylene-propylene copolymers having up to 10 wt % ethylene, ethylene-propylene rubbers and propylene-ethylene-butene-1 terpolymers having up to 10 wt % ethylene and up to 5 wt % butene-1. Typically, the ethylene content of such terpolymers is about 0.5 to 10 wt % and the butene-1 content is about 0.2 to 5 wt % with generally lower amounts of ethylene present as the amount of butene-1 is increased, for example, with 1 wt % butene-1 present, the ethylene content may be 1 to 2 wt %, whereas for 0.3 wt % butene-1, the ethylene content may be 2 to 4 wt %. Minor amounts of butene-2 (<2.5 wt %) and isobutene (<0.5 wt %) based on butene-1 can also be present. These terpolymers have at least 40% crystallinity and typically at least 50% crystallinity as determined by x-ray diffraction analysis. The low flexural modulus component can have any degree of polymerization so long as it is compatible with the other polymeric components and the resulting polymeric composition is capable of being melt-extruded into a film, although it is preferable that the low flexural modulus component have a MFR of about 0.5 to about 5.0 dg/min measured at 230° C. under a load of 2.16 kg as specified by ASTM D-1238. Polymeric compositions containing low flexural modulus polymers with MFRs of less than 0.5 or greater than 5.0 dg/min generally are not easily converted into oriented microporous films having desirable elongation, tear strength and breathability properties.

Component C comprises a homopolymer or random copolymer of propylene having up to 10 wt % of another comonomer or mixtures of comonomers such as ethylene and an α-olefin of 4 to 8 carbon atoms. These homopolymers or random copolymers of propylene, also described herein as the polypropylene component, have at least 40% crystallinity and typically at least 50% crystallinity as determined by x-ray diffraction analysis. The polypropylene component can have any degree of polymerization so long as the resulting polymeric composition is capable of being melt-extruded into a film, although it is preferable that the polypropylene component have a MFR of about 1.0 to about 30 dg/min measured at 230° C. under a load of 2.16 kg as specified by ASTM D-1238. Polymeric compositions having polypropylenes with a MFR of less than 1.0 or greater than 30 dg/min generally are not easily converted into oriented microporous films having desirable strength and breathability properties. For ease of processing and production of porous films with desirable properties, a particularly preferred range of MFR for homopolymers and random copolymers of propylene is about 2.0 to about 5.0 dg/min.

Component D, comprising a low molecular weight polypropylene which can be optionally present, is a polypropylene homopolymer having a weight average molecular weight in the range of about 30,000 to about 100,000. Particularly preferred is low molecular weight polypropylene having a melt viscosity of about 50 to about 1,000 poise when measured at a shear rate of 136 sec$^{-1}$ and a temperature of 190° C., and most preferred is a polypropylene having a melt viscosity of about 70 to about 550 poise measured at the same conditions. Film made from compositions containing greater than 5 pbw of the low molecular weight polyolefin have a greater tendency to tear during stretching. For one preferred embodiment of this invention in which the compositions capable of being formed into microporous films comprise a beta-spherulite nucleating agent, the low molecular weight polyolefin can range from 0 to about 5 pbw. It is contemplated that the low molecular weight polypropylene component can also be provided by the homopolymer or random copolymer of propylene component when such component has a broad molecular weight distribution and that portion of low molecular weight polypropylene required in the polymeric composition is included in the amount of low molecular weight material of the polypropylene component. Copolymers of α-olefins such as ethylene, butene and mixtures of these with propylene and other modified ethylene polymers such as impact modifiers, ethylene-propylene rubber, ethylene methyl acrylate, ethylene vinyl acetate, and the like, as well as polybutene can replace a part, usually less than 50%, of the low molecular weight polypropylene component. Suitable low molecular weight polypropylenes can be made by known techniques and also are commercially available, such as for example, from Polyvisions Inc. as Proflow-1000 and Proflow-3000.

Component E comprises an inorganic filler such as calcium carbonate. The inorganic fillers which can optionally be used in the polymeric compositions of this invention are solid inorganic metal salt particles which are non-hygroscopic, light-colored, water insoluble, highly pure, easily pulverized, finely divided, and have densities below 3.0 g/cc and melting points above polymer degradation temperatures. Calcium carbonate particles, which are preferred, can be in any suitable naturally occurring or man-made form. Naturally occurring forms include the rather pure crystals of calcite with a hexagonal geometric form and aragonite with an orthorhombic geometric form. The melting point of greater than 800° C. for calcium carbonate is in excess of any temperatures that might typically be used, even momentarily, to process thermoplastic polymers. The calcite form of calcium carbonate has a rating of 3 on the Mohs' Scale of Hardness, barely above gypsum, and this degree of softness permits easy and rapid pulverizing. Suitable man-made, highly pure, commercially available forms of calcium carbonate include precipitated chalk and the like with very finely divided, pure particles in the range of 0.05 to 10 microns. Preferably, calcium carbonate with the average particle size of about 0.1 to about 10 microns is used in the polymeric compositions of this invention to form highly breathable porous film. Calcium carbonate can be obtained as a pure mineral powder from commercial sources such as OMYA Inc. or the J. Huber Co. Alternatively, a pelletized masterbatch concentrate of calcium carbonate in a suitable carrier resin, such as polypropylene, can be obtained from suppliers or custom compounders such as the A. Schulman Co. Examples of concentrates from A. Schulman Co., include grades known as PF-85F and PF-160F, which contain 40 wt % and 60 wt % filler, respectively. The filler consists of 35 wt % calcium carbonate and 5 wt % $TiO_2$ for PF-85F, and 52.5 wt % calcium carbonate and 7.5 wt % $TiO_2$ for PF-160F. The calcium carbonate particles in these concentrates has a mean particle size of 0.8 microns, and the polypropylene resin used is a homopolymer with a MFR in the range of 4 to 6 dg/min. The calcium carbonate used in these concentrates has a surface treatment of 1 wt % stearic acid to help disperse calcium carbonate in the polymer matrix. Surface treatments of calcium carbonate with other fatty acids or acid salts may also be used to aid dispersement of the filler in the polymer.

Calcium carbonate is aptly described as "water insoluble" in that it cannot be dissolved in deionized water to a sufficient extent to form a 0.1 wt % aqueous solution at 23° C. Even at temperatures up to 100° C., the maximum solubility of $CaCO_3$ in deionized water is about 0.002 wt %. Calcium carbonate is sensitive to acid, but is generally non-reactive with polymers such as polyolefins and polyurethanes or with organic materials such as plasticizers; and is for all practical purposes, substantially neutral in organic media. Calcium carbonate is non-hygroscopic in the sense that it does not pick up moisture from the air, and particles of this salt do not have a tendency to "cake" or agglomerate due to absorbed moisture. Commercial grades of sodium chloride, for example, are generally too hygroscopic to be conveniently used in this invention. The specific gravity of hexagonal calcium carbonate is only slightly above 2.7, and all forms of the salt have a specific gravity of less than 3.

Other inorganic salts with properties similar to calcium carbonate, e.g., alkaline earth metal carbonates and sulfates of low solubility, such as magnesium carbonate, calcium sulfate and barium sulfate, can be substituted for calcium carbonate. Generally, however, these other salts lack one or more of the advantages of calcium carbonate. Barium sulfate is water insoluble, soft with a Mohs' Hardness value of 2.5 to 3.5, very high melting, and generally white or light colored in finely divided form, but its specific gravity of almost 4.5 detracts from the prospect of making light weight films which contain high loadings of unbleached filler. Calcium sulfate is low in hardness, low in density, light in color, and very high melting, but is more water soluble than calcium carbonate. Being capable of acidic behavior, this salt is not neutral and may react with some organic polymers at elevated temperatures. Magnesium carbonate is more neutral and water insoluble, but is slightly harder, slightly denser, and subject to decomposition at relatively low temperatures, e.g., 350° to 400° C.

It is within the scope of the polymeric compositions of this invention to use inorganic fillers having a variety of colors, or to add color to them. Calcite, for example, occurs naturally in a wide variety of colors. The inorganic filler can act as a pore or channel forming agent as well as a pigmentation agent. By adding small amounts of calcium carbonate to the polymeric compositions of this invention, the breathability of the oriented film is enhanced by the action of polymer pulling away from the calcium carbonate to create voids during orientation. The particles of $CaCO_3$, after orienting, are located within the walls defining the pores or otherwise associated with the porous film structure, and can impart both color and opacity to the oriented polymeric microporous films.

Component F comprises a beta-spherulite nucleating agent. Commonly assigned U.S. Pat. No. 4,975,469, incorporated herein by reference, and references cited therein disclose beta-spherulite nucleating agents such as the gamma-crystalline form of a quinacridone colorant, the bisodium salt of orthophthalic acid, the aluminum salt of 6-quinizarin sulfonic acid and to a lesser degree isophthalic and terephthalic acids. The nucleating agents are typically used in the form of powdered solids. To produce beta-spherulites efficiently, the powder particles of the nucleating agent should be less than 5 microns in diameter and preferably no greater than 1 micron in diameter. The preferred beta-spherulite nucleating agent that may be used in the polymeric compositions of this invention is the gamma-crystalline form of a quinacridone colorant. One form of the quinacridone colorant is red quinacridone dye, hereinafter referred to as "Q-dye", having the structural formula

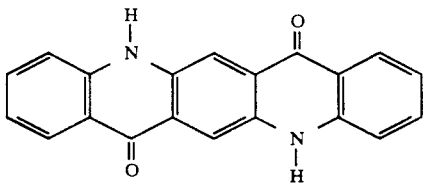

In preparing the polymeric compositions of this invention, the individual components can be added to conventional blenders such as roll mills, drum tumblers, double-cone blenders, ribbon blenders, and the like, or two or more of the individual components can be pre-blended, formed into a masterbatch and mixed with the remaining blend components. The beta-spherulite nucleating agent, generally in the form of powder, can be dispersed in mixtures of polymeric components by any of the procedures normally used in the polymer art to ensure the uniform mixing of powder and polymer resin in the form of pellets. For example, the Q-dye nucleating agent in powder form can be blended with the polymer components in powder or pellet form or the Q-dye can be slurried in an inert medium and the slurry used to coat the polymer powder or pellets. Alternatively, mixing at elevated temperatures can be accomplished by using, for example, a roll mill or multiple passes through a melt-compounding extruder. A preferred mixing procedure is the blending of the nucleating agent in powder form with polymer pellets or powder followed by melt-compounding the resulting mixture in a single-screw or multiple-screw extruder. Multiple passes may be necessary to ensure the desired level of dispersion of nucleating agent in the polymer. This procedure can also be used to form a masterbatch of nucleating agent and with one or more polymeric components. It is important that the polymeric composition be homogeneous so that films obtained have a uniform distribution of components in order that oriented polymeric microporous films with uniform elongation, tear strength and breathability are obtained.

For compositions including a beta-spherulite nucleating agent, a critical parameter in the formation of beta-spherulites in the film is the rate at which the film is cooled. Other parameters being equivalent, the more rapid the cooling, the smaller the size of the beta-spherulites formed. If the molten film is cooled too rapidly, it is possible that essentially no beta-spherulites are formed. Conversely, the slower the film is cooled, the larger the size of the beta-spherulites formed. Little or no beta-spherulites are formed below about 80° C. or above about 130° C. The cooling conditions required to achieve the desired size of the beta-spherulites can be controlled by one or more of the following parameters: polymer melt temperature, extrusion rate, drawdown ratio, die gap and chill roll temperature for extruded film, and cooling air velocity and temperature for blown film. Other things being equivalent, an increase in one of the following parameters results in a decrease in the rate at which the molten film is cooled or quenched and, consequently, an increase in the size of the beta-spherulites formed: polymer melt temperature, extrusion rate, die gap, cooling air temperature, and chill roll temperature. By contrast, other things being equal, an increase in either the drawdown ratio or cooling air velocity results in an increase in the quench rate and an associated decrease in the size of the beta-spherulites formed.

Small amounts, usually less than about 5 pbw based on the total weight of the polymeric components of the composition, of other materials used in processing polymeric compositions such as lubricants, plasticizers, processing plasticizers, surfactants, water, and the like, may optionally be present. Yet other materials introduced for particular purposes may optionally be present in the polymeric compositions in small amounts, usually less than about 15 pbw based on the total weight of the polymeric components of the composition. Examples of such materials include antioxidants, antimicrobial agents, ultraviolet light absorbers, flame retardants, dyes, pigments, and the like. The addition of these materials can take place as the compositions are being prepared or during the time when the compositions are being formed into microporous film, and the addition can be made by any suitable means such as metering pumps, extruders, and the like.

A particularly useful additive in the polymeric compositions of this invention is an antimicrobial agent. As used herein antimicrobial agents include both fungicidal and antibacterial agents and are materials for deodorizing or inhibiting bacterial, fungal or microbial growth in synthetic textile articles such as surgical gowns and masks, and institutional textile products. Inhibiting fungal growth serves to protect the fabric itself, while the inhibition of bacterial growth prevents odor caused by the bacterial breakdown of organic matter. Antimicrobial agents, disclosed in U.S. Pat. No. 4,343,853 which can be added to the polymeric compositions of this invention, include nitrophenylacetate, phenylhydrazine, polybrominated salicylanilides such as 5,4'-dibromosalicylanilide and 3,5,4'-tribromosalicylanilide, chlorhexidine, domiphen bromide, cetylpyridinium chloride, benzethonium chloride, 2,2'-thiobis(4,6-dichloro)phenol, 2,2'-methylenebis-(3,4,6-trichloro)-phenol and 2,4,4'-trichloro-2'-hydroxydiphenyl ether.

A particularly preferred antimicrobial agent comprises 2,4,4'-trichloro-2'-hydroxydiphenyl ether which provides suitable antimicrobial effect when present in polymeric compositions at concentrations of about 100 to about 2,000 ppm, by weight of the polymeric components of the composition. At concentration levels below 100 ppm in the polymeric composition, the antimicrobial effect generally is insufficient after the composition has been processed into a microporous film. Preferably, about 200 to about 750 ppm of 2,4,4'-trichloro-2'-hydroxydiphenyl ether, by weight of the polymeric components of the microporous film, are present to ensure retention of the microbial effect after processing. A specific example of such an antimicrobial agent is that designated as Microban® Plastic Additive B from Clinitex Corporation of Huntersville, N.C.

The antimicrobial agent can be incorporated into the microporous film prepared from the polymeric compositions by combining the agent with the composition prior to or during extrusion of the film so that the agent is substantially uniformly dispersed in the composition in the molten state. Preferably, a concentrate or masterbatch of about 5 to about 15 wt % antimicrobial agent in the propylene homopolymer component of the polymeric composition is employed to simplify handling of the agent and to improve dispersion of the agent in the polymeric composition and microporous film prepared therefrom.

Generally, the following procedure is used in forming polymeric compositions of this invention capable of being formed into microporous film. Based on 100 parts by weight (pbw) of polymeric components A, B and C described above, about 30 to about 65 pbw of ethylene-propylene block copolymer having about 10 to about 50 wt % ethylene, about 55 to about 5 pbw of a low flexural modulus propylene-based polymer having a flexural modulus of 20,000 psi or less as measured according to ASTM D-790, about 15 to about 30 pbw of propylene homopolymer or random copolymer of propylene having up to 10 wt % of a comonomer of ethylene or an α-olefin of 4 to 8 carbon atoms, 0 to about 5 pbw of low molecular weight polypropylene, about 10 to about 30 pbw $CaCO_3$, and about 0.1 to about 10 ppm beta-spherulite nucleating agent are homogenized in conventional mixing equipment and formed into a melt in an extruder. The melt temperature is in the range of about 180° to about 270° C., preferably about 200° to about 240° C. The polymer melt is fed through a slot-die from which melt is extruded as a film. Commonly, the width of the slot-die can range from about 2 to more than 375 cm in width and the opening dimension of the slot-die can range from about 0.25 to about 1.2 mm. As the extruded film emerges from the die and begins to cool, it contacts a chill roll and is cooled further by the chill roll maintained at a temperature of about 80° to about 130° C. The polymer melt temperature, extrusion rate, drawdown ratio, slot-die opening dimension and temperature of chill rolls can be used to control the cooling rate of the film and thereby the size of the beta-spherulites as discussed hereinabove.

The dried film is heated by heating rolls to a temperature of about 110° to about 135° C. for about 2 to about 20 seconds before being oriented on a tenter stretcher. The stretching can be uniaxial or biaxial at stretch ratios of about 1.5 to about 10. Biaxial stretching can be done either simultaneously or sequentially with sequential biaxial stretching having stretching in the machine direction first. The oriented microporous film produced can be wound onto a take-up roll.

Films prepared from the compositions of this invention were very uniform and homogeneous with good strength and ductility in both the machine direction (MD) and cross-machine direction (CD) or transverse direction (TD). Tensile property data obtained on films prepared from compositions of this invention indicated that break elongations in both the MD and TD direction can be up to two to three times greater for the composition film than for film produced from polypropylene homopolymer. The films of the composition also showed an improvement of about 10 to 50% in tensile strength compared to film produced from polypropylene homopolymer.

In more detail, the facile process for preparing oriented polymeric microporous films from compositions of this invention wherein the films have microvoid cells and interconnecting pores between the cells comprises the steps of:

(1) forming a film from a polymeric composition comprising, based on 100 parts by weight of polymer components, about 30 to about 65 parts by weight of a component A comprising an ethylene-propylene block copolymer having an ethylene content of about 10 to about 50 wt %, about 55 to about 5 parts by weight of a component B comprising a low flexural modulus propylene-based polymer having a flexural modulus of 20,000 psi or less as measured according to ASTM D-790, about 15 to about 30 parts by weight of a component C comprising a propylene homopolymer or random copolymer having up to about 10 wt % of a comonomer of ethylene or an α-olefin of 4 to 8 carbon atoms, and 0 to about 5 parts by weight, per 100 parts by weight of components A, B and C, of a component D comprising a low molecular weight polypropylene having a melt viscosity of about 50 to about 1,000 poise measured at a shear rate of 136 $sec^{-1}$ and 190° C., 10 to about 30 parts by weight, per 100 parts by weight of components A, B and C, of a component E comprising calcium carbonate, and 0.1 to about 10 ppm, per 100 parts by weight of components A, B and C, of a component F comprising a beta-spherulite nucleating agent, (2) heating the film at a temperature of about 35° to about 135° C., and (3) stretching the heated film in at least one direction at a stretch ratio of about 1.5 to about 10.

In step (1) of the process a film is formed from the polymeric composition by any suitable process known in the art for forming films from polymeric compositions and, in particular, polyolefin-based compositions. Among these are processes including melt-forming processes such as slot-die extrusion and blown-bubble extrusion, with the slot-die extrusion process preferred for ease of operation. In either the blown-bubble or the slot-die extrusion process the polymer composition is formed into a melt by a melt-forming means such as a single-screw or a twin-screw extruder. The polymeric composition together with optional additives or modifiers can be supplied in pellet or powder form to the extruder or the various composition components can be supplied directly to the melt-forming means for a combination of compounding and melting. Typically, temperatures in the extruders range from about 180° to about 270° C. and, in particular, for polyolefin-based compositions from about 200° to about 240° C. The residence time of the polymeric compositions in the extruders can vary with the size of the equipment and desired throughput but should be sufficiently long to achieve mixing and melting while at the same time avoiding degradation of polymer. In the blown-bubble extrusion process, the film is preferably cooled with a stream of air. In the slot-die extrusion process, the cooling can be accomplished with liquid in a cooling bath, such as water, a chill roll or a stream of air with chill rolls typically used. For film formed from polyolefin-based compositions with one or more chill rolls, the rolls typically have temperatures of about 80° to about 120° C.

The film provided in step (1) can be taken directly from the film forming operation or it can be wound on a take-up roll and provided to step (2) from these take-up rolls. Steps (2) and (3) include heating and stretching steps, respectively, by which the film is rendered microporous. The film is heated by any suitable heating means for a time and at a temperature such that the film attains the desired temperature in as short a time as possible while retaining strength properties. Typically, heating rolls are used to heat the film to the desired orientation temperature. For films stretched simultaneously in both directions the desired temperature ranges from about 35° to about 130° C. The desired temperature ranges for orientation in the machine direction and subsequently in the transverse direction are different for the two orientations. The desired temperature for orientation in the machine direction can range from about 30° to about 95° C., with a preferred temperature range of about 35° to about 75° C. for films formed from polyolefin-based compositions. In the subsequent transverse direction orientation, the desired temperature can range from about 75° to about 140° C., with a preferred temperature range of about 90° to about 130° C. for polyolefin-based compositions. Attempts to orient films at temperatures outside the preferred temperature ranges typically do not produce films with the desired porosity and strength properties.

In addition to the type of orientation, the composition of the film also influences the orientation temperature. For films comprising ethylene-propylene block copolymer, polypropylene homopolymer or random copolymer of propylene and low molecular weight polyolefin the films are preferably heated to a temperature of about 50° to about 80° C. For films comprising ethylene-propylene block copolymer, propylene homopolymer or random copolymer, low flexural modulus propylene-based polymer, low molecular weight polyolefin, a beta-spherulite nucleating agent and an inorganic filler such as calcium carbonate the films are preferably heated to a temperature in the range of about 35° to about 135° C.

In step (3) the heated film can be stretched uniaxially or biaxially. Uniaxial stretching can be performed using rolls with a roll or tenter for restraining the film. Biaxial stretching can include successive uniaxial stretching steps comprising longitudinal stretching by rolls and transverse stretching by a tenter, simultaneous biaxial stretching using a tenter, and the like. For biaxial stretching, the stretch ratio in the longitudinal or machine direction and transverse direction may be the same or different. Generally, the stretch ratios are the same in both directions. The stretch ratio for either uniaxial or biaxial orientation can be about 1.5 to about 10. The preferred method of biaxial stretching includes the formation of a film by extruding a film with a small amount of MD orientation usually less than 25% of the total MD orientation. The formed film is further oriented in the MD followed by orientation in the TD such that the ratio of the final MD to TD orientation draw ratio is about 0.8 to 1.2. The preferred stretch ratio in each direction for biaxial stretching is about 1.5 to about 5 and for uniaxial stretching about 1.5 to about 6.

The oriented polymeric microporous films formed from the polymeric compositions of this invention can be made within a wide range of film thickness or caliper. For the uses contemplated for these films, a thickness of more than 0.005 mm and less than about 2 mm is generally preferred. Films having a thickness in the range of about 0.01 to about 1 mm are particularly useful. A measurable decrease in caliper or thickness normally occurs after the stretching step. For uniaxial orientation, this decrease can be as much as one-third of the thickness of the unoriented film. For biaxial and uniaxial orientations with very high stretch ratios, the decrease in thickness can be even greater. Preferably, the thickness of oriented films produced by this invention ranges from about 0.005 to about 1.0 mm in thickness. The thickness of unstretched films from which the oriented films are formed can range from about 0.01 to about 2.0 mm.

Components A, B, C, D, E and F as defined above can be present in the polymeric compositions of this invention for forming oriented microporous films based on 100 pbw of the total weight of Components A, B and C as follows: about 30 to about 65 parts by weight of component A, about 55 to about 5 parts by weight of component B, about 15 to about 30 parts by weight of component C, 0 to about 5 parts by weight of component D, about 10 to about 30 parts by weight of component E, and about 0.1 to about 10 ppm by weight of component F. Particularly preferred polymeric compositions for forming oriented microporous films with a MVTR of 500 g/m$^2$/24 hr or greater comprise, based on 100 parts by weight of the total weight of Components A, B and C, about 40 to about 65 parts by weight of component A,
about 40 to about 5 parts by weight of component B,
about 20 to about 30 parts by weight of component C,
about 1 to about 5 parts by weight of component D,
about 20 to about 30 parts by weight of component E, and
about 0.5 to about 5 ppm by weight of component F.

Addition of a low flexural modulus propylene-based polymer to the polymeric compositions significantly improves the elongation and tear strength of the resulting microporous films. The increased elongation improves the extensibility, or ability of a material to stretch or elongate without breaking, which is especially useful for microporous film applications utilizing the moisture vapor release properties of the film such as for garments and the like. Noise levels of film being flexed is also reduced as the elongation property of the film is increased.

General aspects of the film-forming processes used in this invention, e.g., pressing, calendering, or extruding of milled polymer/inorganic salt mixtures, are well known in the art. Heating of the milled mixture is conventionally involved in these film-forming methods. The particles of the inorganic salt can be added in increments during the milling step. Casting, e.g., of solutions of polymer filled with pore-nucleating particles, is not preferred.

In one embodiment of the process for forming an oriented microporous polymeric film from the polymeric compositions of this invention, wherein the film has a thickness of about 0.005 to about 0.2 mm and a MVTR determined according to ASTM E-96, procedure E, of about 1,500 g/m$^2$/ 24 hr or greater, the process comprises the steps of:

(a) forming a film having a thickness of at least 0.05 mm and at least 20 wt % beta-spherulites from a polymeric composition comprising, per 100 pbw of block copolymer, polypropylene and low flexural modulus propylene-based polymer, about 40 to about 65 pbw of an ethylene-propylene block copolymer having an ethylene content of about 30 to about 45 wt %, about 40 to about 5 pbw of a low flexural modulus propylene-based polymer having a flexural modulus of 20,000 psi or less as measured according to ASTM-D790, about 20 to about 30 pbw of a polypropylene having a MFR of about 1.0 to 30 dg/min as determined according to ASTM D-1238, about 1 to about 5 pbw of a low molecular weight polypropylene having a melt viscosity of about 50 to about 1,000 poise measured at a shear rate of 136 sec$^{-1}$ and a temperature of 190° C., about 20 to about 30 parts by weight of calcium carbonate having an average particle size in the range of 0.1 to 10 microns, and about 0.5 to about 5 ppm of a red quinacridone dye having the structural formula:

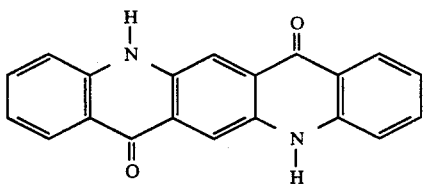

on a cast film line with an extruder having a polymer melt temperature of about 200° to about 240° C., slot-die opening dimensions of about 0.25 to about 1.2 mm, and chill roll temperatures of about 70° to about 120° C., (b) uniaxially orienting the film in the machine direction by heating the film to a temperature of about 35° to about 75° C. and stretching the heated film in the machine direction at a stretch ratio of about 1.5 to about 6, and (c) biaxially orienting the film of step (b) by heating the film to a temperature of about 90° to about 130° C. and stretching the heated film at a stretch ratio in the transverse direction at a stretch ratio of about 1.5 to about 6.

Films made from the polymeric compositions of this invention may be employed in a wide variety of applications where their microporous structures are useful including the apparel, membrane and ultrafiltration areas. Among the applications contemplated are filters, separators in electrochemical cells, reverse osmosis membranes, house wraps, covers for equipment such as automobiles, motor bikes, stationary equipment and the like, breathable bandages and other vapor permeable first aid dressings, surgical drapes and protective garments for use in hospitals and in electronic clean rooms or other areas where chemical spills may occur, conformable and printable backings for coated and laminated articles, typewriter and other inking ribbons, sheets or pads, breathable garments, or clothing materials of footwear such as leather substitutes or rainwear, battery separators, breathable shoe inserts or insole material, flexible gas-permeable containers such as sterilizable package for surgical instruments and the like.

Stretched porous film containing starch can be used in disposable applications such as diapers and agricultural mulch film. Mulch film can also have about 5 to about 15 wt % cornstarch incorporated into it. For agricultural mulch film, the starch-containing porous film can be impregnated with pesticides and/or fertilizers which are released over the growing season. The starch-containing mulch film upon exposure to the sun during the growing season degrades sufficiently so that the film can be plowed under at the end of the growing season without costly removal and disposal. The films should also prove useful in the application of making pressure sensitive labels wherein the oriented polypropylene microporous films offer the advantage of improved drying characteristics and printability of the labels and lower water absorbency compared to paper when water-based adhesives are used and improved adhesive curing is obtained from the moisture release through the porosity of the microporous film.

The oriented microporous film produced from the polymeric compositions of this invention can be incorporated as one or more layers into composite structures with supporting materials such as a polymeric foam material, a woven fabric or a nonwoven fabric such as a carded web of staple fibers, a spunbond fabric, a meltblown fabric, a self-bonded nonwoven web such as RFX ® fabric and cross-laminated fibrillated film fabrics such as CLAF ® fabric. The layers can be adhered to each other or laminated together by conventional methods such as adhesive bonding, thermobonding, or other techniques which do not significantly decrease the vapor permeable and liquid impermeable properties of the porous film. For example, the microporous films can be adhered to CLAF ® fabric made of polypropylene by thermobonding and to CLAF ® fabric made of polyethylene by adhesive bonding.

Description of test procedures used to determine properties reported for the examples of this invention and comparative examples are as follows:

Melt Flow Rate—Melt flow rates of polyolefin resin samples were measured according to ASTM D-1238.

Flexural modulus—Flexural modulus properties were determined on test specimens according to ASTM D-790.

Tensile Strength and Elongation—Test specimens of 2.54 cm wide samples of the films were used to determine tensile strength and elongation according to the strip test of ASTM D-1682. The tensile strength was measured in the machine direction and in the transverse direction and is reported in units of pounds or grams.

Basis Weight—The basis weight of films was determined by weighing a one-foot square representative sample of the film on a digital balance to ±0.01 g. This weight was used to calculate the basis weight of the film in units of oz/yd$^2$ or g/m$^2$.

Moisture Vapor Transmission Rate—The moisture vapor transmission rate was determined according to ASTM E-96 Procedure E in units of g/m$^2$/24 hr.

The following examples further elaborate the present although it will be understood that these examples are for purposes of illustration and are not intended to limit the scope of the invention.

EXAMPLES 1-4

The oriented microporous film of Example 1 was prepared from a composition of ethylene-propylene block copolymer containing 40 wt % ethylene and having a MFR of 1.0 dg/min (Himont, Hifax RA-061); polypropylene homopolymer having a MFR of 3.0 dg/min (Amoco Chemical Co., 6300 P); low molecular weight polypropylene having a melt viscosity of 137 poise as measured at a shear rate of 136 sec$^{-1}$ and a temperature of 190° C. (Polyvisions Inc., Proflow-1000); a masterbatch (A. Schulman Co., PF-160 F.) of polypropylene having a MFR of 6 to 8 dg/min with 52.5 wt %, based on the total weight of the masterbatch, of calcium carbonate (CaCO$_3$) having a mean particle size of 0.8 microns and 7.5 wt %, based on the total weight of the masterbatch, of TiO$_2$; a low flexural modulus propylene-based polymer (Himont, KS-051 P); a beta-spherulite nucleating agent, red quinacridone dye (Hoechst-Celanese, E3B) and process stabilizers. A process stabilizer masterbatch was prepared from a dry blend of polypropylene homopolymer having a MFR of 3.2 dg/min determined according to ASTM D-1238 and a stabilizer concentrate of a hindered phenol, a phosphonite and calcium stearate. The masterbatch contained 95.5 wt % polypropylene and 4.5 wt % stabilizer concentrate. The concentrate in pellet form was melt-compounded together with other components to achieve the polymeric composition listed below:

| Component | Concentration, wt % |
|---|---|
| Ethylene-propylene block copolymer | 37.4 |
| Polypropylene homopolymer | 22.26 |
| Low modulus propylene-based polymer | 10.0 |
| Low molecular weight polypropylene | 2.0 |
| $CaCO_3$ | 23.96 |
| $TiO_2$ | 4.00 |
| Process stabilizers | 0.38 |
| Beta-spherulite nucleant | 2 ppm |
| | 100.0 |

The composition was compounded and pelletized on a single-screw extruder. The pelletized resin was cast into film from a 152 mm extruder having a 111.8 cm wide die with die lip gap of 20 mils onto a heated roll with a surface temperature of 106.1° C. The thickness of the cast film ranged from 3.9 to 4.4 mils with a variation of no more than ±0.2 mils across the width of the film except for the outer 2.5 to 4.0 cm of both edges of the film where the thickness of the film increased to 5 to 9 mils due to the design of the die lip. The extruder had a typical output rate of 160 kg/hr. The speed of the cast film line was 0.36 m/s and the MD orientation ratio was 1.8:1. The film widths in the MD at the inlet and outlet were 50.8 cm and 48.3 cm, respectively. The orientation in the MD was made at a temperature of 65° C. The orientation in the TD was made at a temperature of 103° C. in the stretch zone and at temperatures of 110° and 118° C. in the two annealing zones. The film line speed in the TD orientation section was 0.65 m/s. Physical properties measured on the oriented microporous films of Example 1 and of the three films of Examples 2, 3 and 4 prepared from the composition and by the process of Example 1 are reported below:

| Example | Basis Weight, oz/yd² | Thickness, mil | One Inch Strip Test | | | |
|---|---|---|---|---|---|---|
| | | | Strength, psi | | Elongation, % | |
| | | | MD | TD | MD | TD |
| 1 | 0.97 | 2.5 | 2480 | 2178 | 262 | 140 |
| 2 | 1.19 | 2.9 | 2095 | 1724 | 242 | 119 |
| 3 | 1.02 | 2.5 | 2400 | 2120 | 233 | 140 |
| 4 | 0.88 | 2.0 | 2450 | 2150 | 238 | 131 |

| Example ID | Elmendorf Tear, lb | | Trap Tear, lb | | Hydrostatic Test, Inches of $H_2O$ | MVTR, g/m²/24 hr |
|---|---|---|---|---|---|---|
| | MD | CD | MD | TD | | |
| 1 | 31 | 16 | 3.8 | 0.2 | 103 | 6,450 |
| 2 | 72 | 17 | 2.9 | 0.2 | 97 | 6,850 |
| 3 | 24 | 20 | 3.5 | 0.2 | 91 | 6,830 |
| 4 | 45 | 24 | 3.2 | 0.2 | 91 | 7,070 |

EXAMPLE 5

The oriented microporous film of Example 5 was prepared from components and by the process described in Examples 1–4 with the exceptions that slightly less ethylene-propylene block copolymer and slightly more polypropylene was used to achieve the polymeric composition summarized below and the cast film was oriented in both the MD and TD at a stretch ratio of 2.0:1 and a temperature of 76.7° C.

| Component | Concentration, wt % |
|---|---|
| Ethylene-propylene block copolymer | 39.95 |
| Polypropylene | 19.71 |
| Low modulus propylene-based polymer | 10.00 |
| Low molecular weight polypropylene | 2.00 |
| $CaCO_3$ | 23.96 |
| $TiO_2$ | 4.00 |
| Process stabilizers | 0.38 |
| Beta-spherulite nucleant | 2 ppm |
| | 100.0 |

Physical properties of the oriented film are reported below:

| Example | Thickness, mil | One Inch Strip Test | | | | MVTR, g/m²/24 hr |
|---|---|---|---|---|---|---|
| | | Strength, psi | | Elongation, % | | |
| | | MD | TD | MD | TD | |
| 5 | 2.72 | 2,253 | 1,668 | 338 | 167 | 3,340 |

EXAMPLE 6

The oriented microporous film of Example 6 was prepared from components and by the process described in Examples 1–4 with the exceptions that no low molecular weight polypropylene was used, and the cast film was oriented in both the MD and TD at a stretch ratio of 2.0:1 and a temperature of 76.7° C.

| Component | Concentration, wt % |
|---|---|
| Ethylene-propylene block copolymer | 41.95 |
| Polypropylene | 19.71 |
| Low modulus propylene-based polymer | 10.00 |
| Low molecular weight polypropylene | 0.00 |
| $CaCO_3$ | 23.96 |
| $TiO_2$ | 4.00 |
| Process stabilizers | 0.38 |
| Beta-spherulite nucleant | 2 ppm |
| | 100.0 |

Physical properties determined for the oriented film are reported below and indicate that with no low molecular weight polypropylene acceptable MVTR values were obtained:

| Example | Thickness, mil | One Inch Strip Test | | | | MVTR, g/m²/24 hr |
|---|---|---|---|---|---|---|
| | | Strength, psi | | Elongation, % | | |
| | | MD | TD | MD | TD | |
| 6 | 2.42 | 2,320 | 1,883 | 277 | 189 | 2,878 |

COMPARATIVE EXAMPLE A

The oriented film of Comparative Example A was prepared from components and by the process described in Examples 1–4 with the exceptions that all of the ethylene-propylene block copolymer was replaced by low modulus propylene-based polymer and a small amount of polypropylene to achieve the polymeric composition given below and the cast film was oriented in both the MD and TD at a stretch ratio of 2.0:1 and a temperature of 76.7° C.

| Component | Concentration, wt % |
|---|---|
| Ethylene-propylene block copolymer | 0.00 |
| Polypropylene | 23.46 |
| Low modulus propylene-based polymer | 46.20 |
| Low molecular weight polypropylene | 2.00 |
| $CaCO_3$ | 23.96 |
| $TiO_2$ | 4.00 |

-continued

| Component | Concentration, wt % |
|---|---|
| Process stabilizers | 0.38 |
| Beta-spherulite nucleant | 2 ppm |
| | 100.0 |

Physical properties of the oriented film are reported below:

| Comparative Example | Thickness, mil | One Inch Strip Test | | | | MVTR, g/m²/24 hr |
|---|---|---|---|---|---|---|
| | | Strength, psi | | Elongation, % | | |
| | | MD | TD | MD | TD | |
| A | 1.72 | 2,296 | 2,915 | 309 | 298 | <1,000 |

COMPARATIVE EXAMPLE B

The oriented film of Comparative Example B was prepared from components and by the process described in Examples 1-4 with the exceptions that the low molecular weight polypropylene component was removed and the ethylene-propylene block copolymer was replaced by low modulus propylene-based polymer and to a small extent by polypropylene to achieve the polymeric composition listed below and the cast film was oriented in both the MD and the TD at a stretch ratio of 2.0:1 and a temperature of 76.7° C.

| Component | Concentration, wt % |
|---|---|
| Ethylene-propylene block copolymer | 0.00 |
| Polypropylene | 23.46 |
| Low modulus propylene-based polymer | 48.20 |
| Low molecular weight polypropylene | 0.00 |
| CaCO₃ | 23.96 |
| TiO₂ | 4.00 |
| Process stabilizers | 0.38 |
| Beta-spherulite nucleant | 2 ppm |
| | 100.0 |

Physical properties of the oriented film are reported below:

| Comparative Example | Thickness, mil | One Inch Strip Test | | | | MVTR, g/m²/24 hr |
|---|---|---|---|---|---|---|
| | | Strength, psi | | Elongation, % | | |
| | | MD | TD | MD | TD | |
| B | 2.02 | 1,744 | 2,242 | 276 | 187 | <1,000 |

COMPARATIVE EXAMPLE C

The oriented film of Comparative Example C was prepared from components and by the process described in Examples 1-4 with the exceptions that the amount of low molecular weight polypropylene was increased from 2 to 4 wt % and all of the ethylene-propylene block copolymer was replaced by low modulus propylene-based polymer and a small amount of polypropylene to achieve the polymeric composition listed below and the cast film was oriented in both the MD and the TD at a stretch ratio of 2.0:1 and a temperature of 76.7° C.

| Component | Concentration, wt % |
|---|---|
| Ethylene-propylene block copolymer | 0.00 |
| Polypropylene | 23.46 |
| Low modulus propylene-based polymer | 44.20 |
| Low molecular weight polypropylene | 4.00 |
| CaCO₃ | 23.96 |
| TiO₂ | 4.00 |
| Process stabilizers | 0.38 |
| Beta-spherulite nucleant | 2 ppm |
| | 100.0 |

Physical properties of the oriented film are reported below:

| Comparative Example | Thickness, mil | One Inch Strip Test | | | | MVTR, g/m²/24 hr |
|---|---|---|---|---|---|---|
| | | Strength, psi | | Elongation, % | | |
| | | MD | TD | MD | TD | |
| C | 2.02 | 1,949 | 2,448 | 284 | 211 | <1,000 |

COMPARATIVE EXAMPLE D

The oriented film of Comparative Example D was prepared from components and by the process described in Examples 1-4 with the exceptions that some of the ethylene-propylene block copolymer was replaced by low modulus propylene-based polymer and to a small extent polypropylene to achieve the polymeric composition listed below and the cast film was oriented in both the MD and TD at a stretch ratio of 2.0:1 and a temperature of 76.7° C.

| Component | Concentration, wt % |
|---|---|
| Ethylene-propylene block copolymer | 23.10 |
| Polypropylene | 23.46 |
| Low modulus propylene-based polymer | 23.10 |
| Low molecular weight polypropylene | 2.00 |
| CaCO₃ | 23.96 |
| TiO₂ | 4.00 |
| Process stabilizers | 0.38 |
| Beta-spherulite nucleant | 2 ppm |
| | 100.0 |

Physical properties measured on the oriented film are reported below:

| Comparative Example | Thickness, mil | One Inch Strip Test | | | | MVTR, g/m²/24 hr |
|---|---|---|---|---|---|---|
| | | Strength, psi | | Elongation, % | | |
| | | MD | TD | MD | TD | |
| D | 2.66 | 1,513 | 2,054 | 252 | 202 | <1,000 |

That which is claimed is:

1. An oriented microporous film having microvoid cells and interconnecting pores between the cells and a moisture vapor transmission rate as determined according to ASTM E-96, procedure E, of about 500 g/m²/24 hr or greater prepared by a process comprising the steps of:

(1) forming a film from a polymeric composition comprising, about 30 to about 65 parts by weight of a component A comprising an ethylene-propylene block copolymer having an ethylene content of about 10 to about 50 wt %, about 55 to about 5 parts by weight of a component B comprising a low flexural modulus propylene-based polymer having a flexural modulus of 20,000 psi or less as measured according to ASTM D-790, about 15 to about 30 parts by weight of a component C comprising a propylene homopolymer or random copolymer having up to about 10 wt % of a comonomer of ethylene or an α-olefin of 4 to 8 carbon atoms, 0 to about 5 parts by weight, per 100 parts by weight of components A, B and C, of a component D comprising a low molecular weight polypropylene having a melt viscosity of about 50 to about 1,000 poise measured at a shear rate of 136 sec$^{-1}$ and 190° C., 10 to about 30 parts by weight, per 100 parts by weight of components A, B and C, of a component E comprising calcium carbonate, and 0.1 to about 10 ppm, per 100 parts by weight of components A, B and C, of a component F comprising a beta-spherulite nucleating agent, (2) uniaxially orienting the film in the machine direction by heating the film to a temperature of about 35° to about 75° C. and stretching the heated film in the machine direction at a stretch ratio of about 1.5 to about 6, and (3) biaxially orienting the film of step (2) by heating the film to a temperature of about 90° to about 130° C. and stretching the heated film at a stretch ratio in the transverse direction at a stretch ratio of about 1.5 to about 6.

2. The oriented microporous film of claim 1 wherein said beta-spherulite nucleating agent comprises a red quinacridone dye having the structural formula:

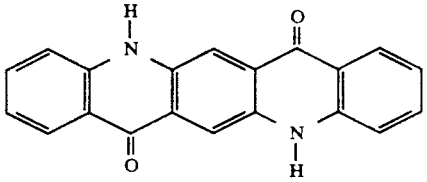

3. The oriented microporous film of claim 2 wherein said ethylene-propylene block copolymer has an ethylene content of about 30 to about 45 wt %.

4. The oriented microporous film of claim 3 having a moisture vapor transmission rate as determined according to ASTM E-96, procedure E, of about 2,500 g/m$^2$/24 hr or greater.

* * * * *